United States Patent
Yamagata (10) Patent No.: US 9,647,503 B2
(45) Date of Patent: May 9, 2017

(54) ROTARY MOTOR AND MANUFACTURING METHOD THEREFOR

(75) Inventor: Yoshikazu Yamagata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 783 days.

(21) Appl. No.: 14/117,264

(22) PCT Filed: Jun. 14, 2012

(86) PCT No.: PCT/JP2012/003874
§ 371 (c)(1),
(2), (4) Date: Nov. 12, 2013

(87) PCT Pub. No.: WO2013/011627
PCT Pub. Date: Jan. 24, 2013

(65) Prior Publication Data
US 2015/0130300 A1   May 14, 2015

(30) Foreign Application Priority Data

Jul. 15, 2011   (JP) .................................. 2011-156409

(51) Int. Cl.
*H02K 3/30*   (2006.01)
*H02K 15/12*   (2006.01)

(52) U.S. Cl.
CPC .............. *H02K 3/30* (2013.01); *H02K 15/12* (2013.01); *H02K 15/125* (2013.01)

(58) Field of Classification Search
CPC ...... H02K 15/10; H02K 15/102; H02K 15/12; H02K 3/38; H02K 27/02; H02K 23/00; H02K 15/16; H02K 3/30
(Continued)

(56) References Cited

U.S. PATENT DOCUMENTS 4,022,748 A * 5/1977 Schlichting ............. C08L 67/02
523/219
4,127,553 A * 11/1978 Osada .................... C08G 63/12
524/376

(Continued)

FOREIGN PATENT DOCUMENTS

GB   000915098   * 1/1963 ........... C08G 59/502
JP   3-070441   3/1991
(Continued)

OTHER PUBLICATIONS

The Extended European Search Report dated Feb. 16, 2017 for the related European Patent Application No. 12815139.6., 10 pages.

*Primary Examiner* — Burton Mullins
(74) *Attorney, Agent, or Firm* — Hamre, Schumann, Mueller & Larson, P.C.

(57) ABSTRACT

The present invention provides a rotary motor including at least a field magnet having field winding, and an armature having armature winding with an electrically insulating coating material applied thereto, and the coating material includes at least two layers of: a lower-layer coating material including a first low-viscosity resin liquid; and an upper-layer coating material including a second low-viscosity resin liquid with at least hollow glass beads and a thermoplastic resin added thereto. Thus, a rotary motor can be achieved which achieves a balance between an efficiency improvement and reliability.

6 Claims, 2 Drawing Sheets

(58) Field of Classification Search
USPC .......................................... 427/104; 29/598
See application file for complete search history.

(56) References Cited

U.S. PATENT DOCUMENTS

| | | | | |
|---|---|---|---|---|
| 4,564,646 A | * | 1/1986 | Nishigaki | C08F 299/028 522/103 |
| 5,024,857 A | * | 6/1991 | Arakawa | H02K 15/12 427/104 |
| 5,384,339 A | * | 1/1995 | Starkey | H01B 3/40 156/275.5 |

FOREIGN PATENT DOCUMENTS

| | | |
|---|---|---|
| JP | 6-014503 A | 1/1994 |
| JP | 6-233510 | 8/1994 |
| JP | 9-157440 A | 6/1997 |
| JP | 10-304612 | 11/1998 |
| JP | 2009-296803 | 12/2009 |
| JP | 2009-303440 | 12/2009 |
| JP | 2001-008425 | 1/2011 |

* cited by examiner

Prior Art

ROTARY MOTOR AND MANUFACTURING METHOD THEREFOR

This application is a U.S. National Phase of PCT International Application PCT/JP2012/003874.

TECHNICAL FIELD

The present invention relates to a rotary motor including at least a field magnet having field winding and an armature having armature winding with an electrically insulating coating material applied thereto, for use in an electric vacuum cleaner or the like, and a method for manufacturing the rotary motor.

BACKGROUND ART

Figure 2:
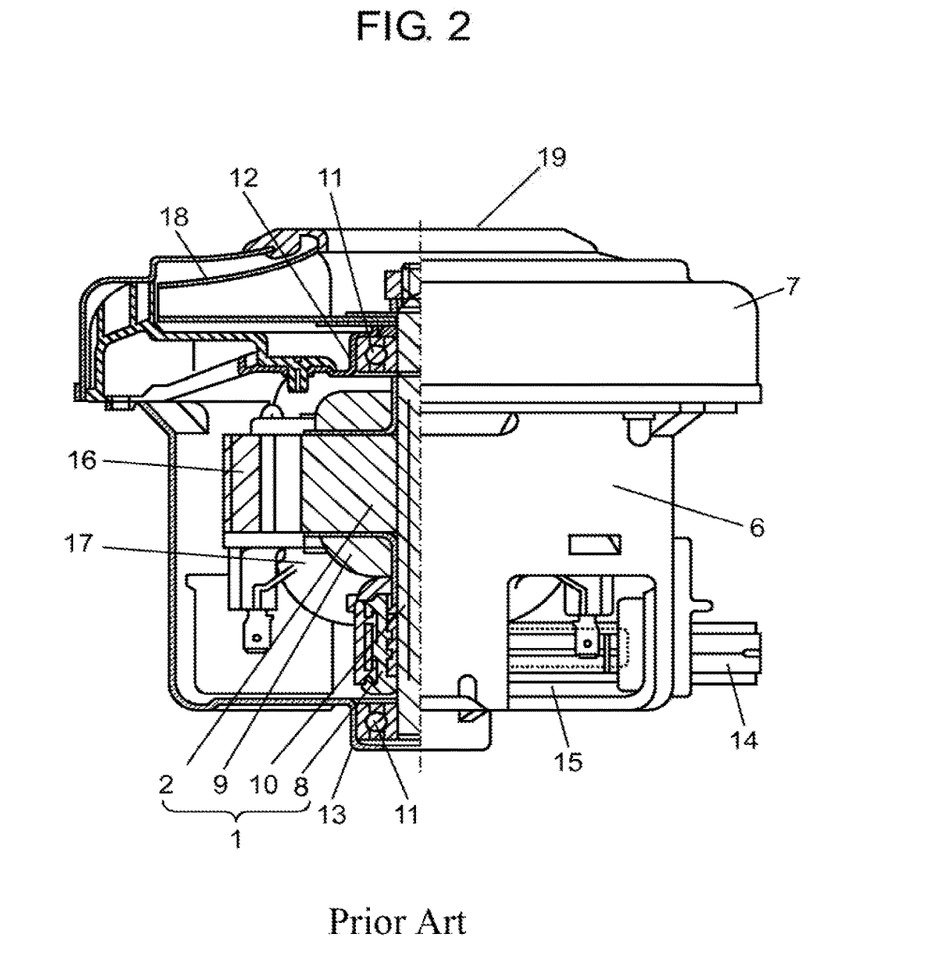
FIG. 2 is a partial side cross-sectional view illustrating the configuration of a commutator motor blower with a typical rotary motor incorporated therein.

In general, a commutator motor blower with a rotary motor incorporated therein is configured as described below with reference to FIG. 2. FIG. 2 is a partial side cross-sectional view illustrating the configuration of a commutator motor blower with a typical rotary motor incorporated therein.

As shown in FIG. 2, the commutator motor blower with the rotary motor incorporated therein includes motor section 6 and fan section 7. Motor section 6 has at least field magnet 16 with field winding 17, and armature 1 including commutator 8 and armature winding 9. Armature 1 is provided with shaft 10, and armature 1 is supported by shaft 10 pressed into bearings 11 provided in fan-side bracket 12 and commutator-side bracket 13 which constitute both ends of the motor. Brush holder 14 includes a metal with carbon brush 15 built therein, and held in commutator-side bracket 13.

Further, fan section 7 is provided with fan 18 for sucking air from intake 19 (upper side in FIG. 2) and blowing the air out to the outer periphery of fan 18. Then, the wind (air) blown out to the outer periphery of fan 18 is partially introduced into motor section 6 to cool down armature winding 9 of armature 1, etc.

Conventionally, the electric wire constituting field winding 17 of field magnet 16 or the armature winding of armature 1 in the rotary motor incorporated in the commutator motor blower structured as described above is firmly fixed with a coating material containing so-called varnish. This fixing suppresses vibrations and sounds caused by the movement of the electric wire during the rotation of the rotary motor. In addition, the fixing prevents the decrease in insulation property caused by degradation of the insulation film coating the electric wire, due to frictions between electric wires. Therefore, the varnish (coating material) has been important, which is applied for adequately firm fixation of electric wires in a slot to each other, and of the electric wires to the slot.

On the other hand, the rotary motor undergoes a decrease in efficiency due to, for example, iron loss, copper loss, mechanical losses such as bearing loss and brush wear loss, and windage loss. Therefore, in order to drive the rotary motor with high efficiency, it is important to reduce these losses. In particular, rotary motors for use in, for example, blower motors for vacuum cleaners are currently driven by high-speed rotations at 40000 rotations/min or more. Therefore, in the rotary motors rotating at high speed, windage losses are dominant, which lead to a decrease in efficiency on the order of approximately 10%. More specifically, the rotary motors rotating at high speed can significantly improve the efficiency through the reduction of windage losses.

However, in general, varnish is applied to coil ends of armature 1 including armature winding 9, only to such an extent that electric wirings are firmly fixed to each other. Therefore, there is a problem that at the coil ends of armature 1, irregularity formed by aggregation of electric wires generates turbulent flows to increase windage losses.

In order to avoid the problem, motors for the disclosure of methods for reducing windage losses due to irregularity are described in, for example, Patent Documents 1 to 4 conventionally.

Patent Document 1 discloses, for an AC commutator motor, a technique of applying electrically insulating coating materials that differ in viscosity twice or more, more than once, to increase the thickness of the coating materials, and smooth the irregularity caused by aggregation of electric wires at coil ends. Specifically, first, the lower-viscosity coating material is applied to electric wires at the coil ends to cause the coating material to penetrate between the electric wires, and firmly fix electric wires in a slot to each other and the electric wires to the slot. Thereafter, the higher-viscosity coating material is applied onto the coil ends with the lower-viscosity coating material applied thereon. Thus, it is concluded that the thick application of the coating materials onto the coil ends can smooth the irregularity.

In addition, Patent Document 2 discloses, for a motor blower, a technique of planarizing irregularity of coil ends with an insulating mold material, and also discloses integrally forming a rotational balance adjustable member.

In addition, Patent Document 3 discloses, for a commutator motor blower, a technique of covering the outer periphery of a fan-side winding wire of an armature with a windage-loss reducing cover including an insulating material.

In addition, Patent Document 4 discloses, for a motor, a technique of smoothly applying an electrically insulating resin onto coil ends by providing the outer periphery of the rotary shaft of the coil ends with a resin movement restricting member for restricting the flow of the electrically insulating resin to be applied.

However, Patent Document 1 for the AC commutator motor discloses the application of the two or more coating materials which differ in viscosity, but fails to disclose any specific composition or viscosity of the coating materials. In general, the viscosity of a coating material significantly varies depending on temperatures. Therefore, in the disclosure of Patent Document 1, it is not clear which temperature is appropriate for the viscosities of the coating materials, or how large difference in viscosity is effective. For example, even when the higher-viscosity coating material is used at room temperature, the viscosity of the coating material may be decreased in some cases while heating to the curing temperature of the coating material is performed after the application, thereby failing to achieve the effect of smoothing the irregularity.

In addition, when a coating material simply with a high viscosity is thickly applied to the coil ends, the coating material has a crack generated by curing and shrinkage after the application. Moreover, there is a problem in terms of reliability, such as the coating material also with a crack generated, or peeling caused during the high-speed rotation of the AC commutator motor, and depending on changes in temperature.

In addition, the motor blower in Patent Document 2 requires a structurally complex mold, because the insulating mold material is integrally formed which also serves as the rotational balance adjustable member. In addition, the motor blower has problems such as decreased insulation performance for the electric wires, or disconnection, due to the pressure for the forming of the insulating mold material, etc. Furthermore, there is a need to use a high-density insulating mold material for also use as the rotational balance adjustable member. Therefore, there is a problem that the weight the armature itself is significantly increased to increase the bearing loss.

In addition, the commutator motor blower in Patent Document 3 has a problem that an air layer between the windage-loss reducing cover and the coil end increases the temperature of the fan-side winding wire to increase copper loss. In addition, in order to use the commutator motor blower as a motor for vacuum cleaner, a thick and large windage-loss reducing cover is required which withstands the centrifugal force of the armature rotating at high speed. Therefore, the motor has difficulty with practical use.

In addition, the motor in Patent Document 4, which is provided with the resin movement restricting member, allows the coating material to be applied thickly to some extent, even when a low-viscosity varnish is used. However, a large resin movement restricting member is required in order to apply adequate varnish in the gaps between electric wires and in a slot, and apply varnish that can smooth irregularity caused by electric wires at the coil ends. In addition, there is a problem that the windage loss due to irregularity of the electric wires on the commutator side of the armature is not able to be suppressed, because the resin restricting member is not able to be placed at the commutator-side coil end of the armature.

CITATION LIST

Patent Literature

PTL 1: Unexamined Japanese Patent Publication No. H10-304612
PTL 2: Unexamined Japanese Patent Publication No. H6-233510
PTL 3: Unexamined Japanese Patent Publication No. 2001-8425
PTL 4: Unexamined Japanese Patent Publication No. 2009-303440

SUMMARY OF THE INVENTION

In order to solve the problems mentioned above, a rotary motor according to the present invention includes at least a field magnet having field winding, and an armature having armature winding with an electrically insulating coating material applied thereto, and the coating material includes at least two layers of a lower-layer coating material including a first low-viscosity resin liquid; and an upper-layer coating material composed of a second low-viscosity resin liquid with at least hollow glass beads and a thermoplastic resin added thereto.

This coating material adequately fixes electric wires of the armature winding to each other, and the electric wires to slots, and can cover and smooth irregularity caused by aggregation of the electric wires at coil ends. As a result, the efficiency can be prevented from being decreased by windage loss, and highly-reliable rotary motors can be achieved with suppressed cracking and peeling of the coating material.

Furthermore, a method for manufacturing a rotary motor according to the present invention includes: a preheating step of heating an armature before applying a coating material; an applying step of applying the coating material by dropping or by extrusion while rotating the armature about a shaft; and a curing step of curing the coating material by further heating the armature after the application.

This method suppresses dripping of the applied coating material before the start of gelation, and can cause the coating material to penetrate uniformly. In addition, the method can smooth the surface of the coating material applied onto coil ends. Furthermore, the method can apply the coating material in a symmetric conical form centered around the shaft to suppress the generation of an imbalance in axial load. As a result, the efficiency is prevented from being decreased by windage loss, and highly-reliable rotary motors can be easily produced with suppressed cracking and peeling of the coating material.

DESCRIPTION OF EMBODIMENTS

Exemplary embodiments of the present invention will be described below with reference to the drawings. It is to be noted that the present invention is not to be limited by the exemplary embodiments.

(First Exemplary Embodiment)

A rotary motor according to a first exemplary embodiment of the present invention will be described below with reference to FIG. 1. It is to be noted that the rotary motor according to the present exemplary embodiment is basically configured in the same fashion as the rotary motor described with reference to FIG. 2 in BACKGROUND ART, the description of the rotary motor will be thus omitted, and the armature as a feature of the present invention will be described below in detail.

Figure 1:
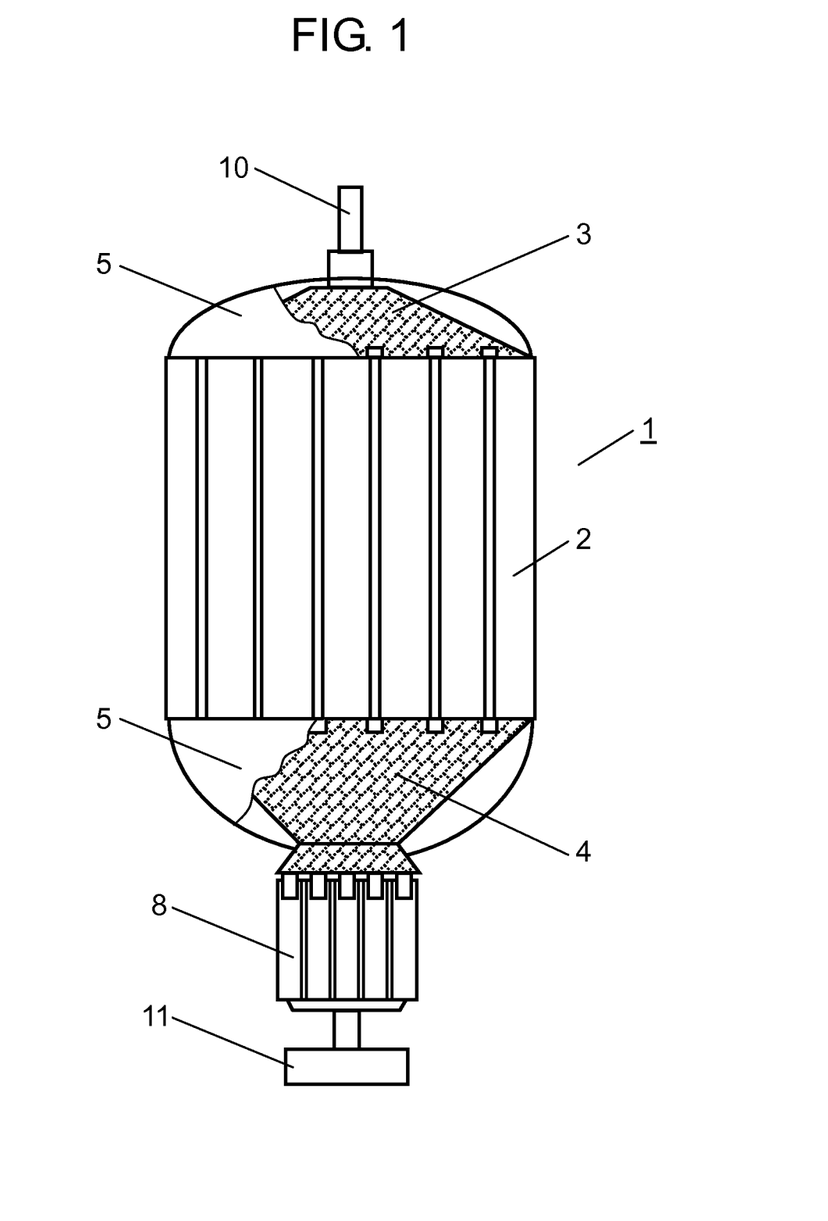
FIG. 1 is a partial cross-sectional view of an armature of a rotary motor according to a first exemplary embodiment of the present invention.

FIG. 1 is a partial cross-sectional view of an armature of a rotary motor according to the first exemplary embodiment of the present invention.

As shown in FIG. 1, armature 1 of the rotary motor according to the present exemplary embodiment is configured to have electric wires wound into coiled shape with interposed insulating paper including, for example, polyamide paper, inside slots formed in laminated core 2 including, for example, a magnetic steel sheet. The coiled electric wires are coated with a coating material including at least two layers of upper-layer coating material 5 and a lower-layer coating material. Specifically, the lower-layer coating material is first applied to the electric wires wound into coiled shape. Thus, the lower-layer coating material firmly fixes the electric wires of fan-side coil end 3 and commutator-side coil end 4 to each other, and the electric wires to the slots and the insulating paper. In this case, the surfaces of fan-side coil end 3 and commutator-side coil end 4 with only the lower-layer coating material applied thereto have irregularity caused by aggregation of the electric wires.

Therefore, upper-layer coating material 5 is further applied so as to cover the irregularity formed on the surfaces of fan-side coil end 3 and commutator-side coil end 4. In this case, the viscosity of upper-layer coating material 5 is higher than at least the viscosity of the lower-layer coating material. Thus, the irregularity caused by aggregation of electric wires on the surfaces of fan-side coil end 3 and commutator-side coil end 4 can be smoothed by upper-layer coating material 5.

The configuration and action of the coating material including the lower-layer coating material and upper-layer coating material 5 will be described below in detail.

First, the lower-layer coating material as a first low-viscosity resin liquid including a thermosetting resin such as, for example, unsaturated polyester is allowed to penetrate into the gaps between the electric wires to firmly fix the electric wires in the slots to each other, and the electric wires to the slots with the low-viscosity lower-layer coating material interposed therebetween.

Next, high-viscosity upper-layer coating material 5 including at least hollow glass beads and a second low-viscosity resin liquid including, for example, unsaturated polyester with a thermoplastic resin such as, for example, saturated polyester added thereto is applied for an upper layer over the electric wires of fan-side coil end 3 and commutator-side coil end 4 firmly fixed with the lower-layer coating material. Thus, upper-layer coating material 5 can be applied thickly so as to cover the irregularity caused by aggregation of the electric wires of fan-side coil end 3 and commutator-side coil end 4.

In this case, the addition of the thermoplastic resin, in particular, saturated polyester resin to upper-layer coating material 5 can reduce the molding shrinkage at the time of curing the coating material, and reduce the influence of heat shock caused by heat generated during the rotation of the rotary motor and cooling during the shutdown period. As a result, the generation of cracks, peeling, etc. due to the molding shrinkage and heat shock can be suppressed in the upper-layer coating material.

It is to be noted that the second low-viscosity resin liquid, thermoplastic resin, and hollow glass beads constituting upper-layer coating material 5 are mixed with the use of an optimum mixer such as, for example, a blade-type agitation mixer, a Banbury mixer, a roll, and a sun-and-planet mixer, depending on the required viscosity of upper-layer coating material 5.

In addition, the addition of hollow glass beads adjusted in terms of particle size and additive amount to upper-layer coating material 5 provides a moderate viscosity and a thixotropic nature to upper-layer coating material 5. Thus, upper-layer coating material 5 is made less likely to flow, particularly because upper-layer coating material 5 undergoes no significant decrease in viscosity in the heating step for curing the coating material. Therefore, upper-layer coating material 5 can be applied thickly to a satisfactory extent onto the electric wires in coil-end parts of fan-side coil end 3 and commutator-side coil end 4 to coat and smooth the irregularity. As a result, windage loss can be reduced to improve the efficiency.

Furthermore, the hollow glass beads have a hollow structure, and thus can have a reduced weight per occupied volume (hereinafter, which may be referred to as "specific gravity") as compared with common glass powders and inorganic fillers, thereby making it possible to have a weight per occupied volume equal to or less than those of common resins. More specifically, the upper-layer coating material can be significantly reduced in weight per occupied volume, as compared with the upper-layer coating material with other solid inorganic filler added thereto. Thus, the centrifugal force proportional to weight (mass) can be further reduced, which is applied to the upper-layer coating material when the armature is rotated at high speed. As a result, peeling, etc. of upper-layer coating material 5 can be further suppressed, which are caused due to the centrifugal force applied during the rotation of the armature.

As described above, according to the present exemplary embodiment, the lower-layer coating material constituting the coating material can firmly fix, with adequate strength, the electric wires in the slots to each other and the electric wires to the slots. In addition, upper-layer coating material 5 constituting the coating material coats and smoothes the irregularity caused by aggregation of the electric wires in coil-end parts of fan-side coil end 3 and commutator-side coil end 4, thereby allowing windage loss to be reduced to increase the efficiency. As a result, a highly-reliable and highly-efficient rotary motor can be achieved without cracking or peeling of the coating material.

It is to be noted that while the unsaturated polyester resins have been described by way of example as the first low-viscosity resin liquid and the second low-viscosity resin liquid in the present exemplary embodiment, the first and second low-viscosity resin liquids are not limited to this unsaturated polyester resin. For example, while liquid varnish may be adopted which is typically used for firmly fixing coils of armatures, at least one of thermosetting resins such as, in particular, epoxy-modified unsaturated polyester resins and epoxy resins may constitute the first low-viscosity resin liquid and the second low-viscosity resin liquid. In this case, the first low-viscosity resin liquid and the second low-viscosity resin liquid are preferably low in viscosity. In particular, the second low-viscosity resin liquid itself is preferably low in viscosity, because upper-layer coating material 5 is adjusted to increase the viscosity with the addition of the hollow glass beads to the second low-viscosity resin liquid. Specifically, for example, the first low-viscosity resin liquid and the second low-viscosity resin liquid preferably have a viscosity of ranging between 0 (zero) Pa·s and 1 Pa·s, more preferably, ranging between 0 (zero) Pa·s and 0.7 Pa·s at 25° C. This is because the use of the first low-viscosity resin liquid and second low-viscosity resin liquid greater than 1 Pa·s in viscosity decreases the permeability into the slots of the armature, thus resulting in insufficient fixation of electric wires or in longer application time. Therefore, the defect mentioned above can be avoided by the reduction of the first low-viscosity resin liquid and second low-viscosity resin liquid in viscosity.

In addition, the hollow glass beads adjusted in terms of particle size and additive amount has been described as added to upper-layer coating material 5 in the present exemplary embodiment. Specifically, for the adjustment of the viscosity of upper-layer coating material 5 and the provision of a thixotropic nature, the hollow glass beads preferably fall between 1 μm and 30 μm in particle size, and the proportion of the hollow glass beads in upper-layer coating material 5 is preferably from 28 weight % to 44 weight % inclusive. In particular, the hollow glass beads are more preferably from 1 μm to 25 μm inclusive in particle size, and the proportion of the hollow glass beads in upper-layer coating material 5 is more preferably from 30 weight % to 40 weight % inclusive. Thus, the rotary motor for use in, for example, an electric vacuum cleaner can achieve a balance between the viscosity and thixotropic nature of upper-layer coating material 5 applied to the armature.

More specifically, when the hollow glass beads are small and less than 1 μm in particle size, or when the proportion of the hollow glass beads in upper-layer coating material 5 is high and greater than 44 weight %, the viscosity of upper-layer coating material 5 will be excessively increased to make handling or application itself difficult.

On the other hand, when the hollow glass beads are large and greater than 30 μm in particle size, or when the proportion of the hollow glass beads in upper-layer coating material 5 is small and less than 28 weight %, the viscosity of upper-layer coating material 5 will be excessively decreased, and it will become impossible to provide any thixotropic nature. Therefore, it will become impossible to apply upper-layer coating material 5 thickly enough to smoothly cover the irregularity of the electric wires in coil-end parts of fan-side coil end 3 and commutator-side coil end 4. Moreover, upper-layer coating material 5 will flow into the shaft of the armature, the laminated core, between copper segments of the commutator, etc. to cause defects such as electrical connectivity of the armature and imbalance in the axial load put on the shaft.

It is to be noted that the viscosity for the first low-viscosity resin liquid and second low-viscosity resin liquid, the particle size for the hollow glass beads, and the proportion of the beads in the upper-layer coating material fall within the ranges described above by way of example, and are obviously not limited to the ranges. The reason thereof is that there are optimum coating materials depending on various factors such as application conditions, e.g., the temperature for the application, the rotation number of the armature, the application speed, and application time; preheating and curing conditions; and furthermore, the shape and size of the armature to be applied and the electric wire size and number of turns. The reason thereof is that the viscosity for the first low-viscosity resin liquid and second low-viscosity resin liquid, and the particle size for the hollow glass beads and the proportion of the beads in the upper-layer coating material are not able to be unambiguously set.

In addition, while the saturated polyester has been described by way of example as the thermoplastic resin in the present exemplary embodiment, the thermoplastic resin is not limited to this saturated polyester as long as the resin can reduce the shrinkage at the time of curing the second low-viscosity resin liquid of upper-layer coating material 5, and suppress the generation of cracks in the coating material. For example, elastomer thermoplastic resins can be used such as polyvinyl acetate, polystyrene, saturated polyester resins, or SBS (styrene butadiene styrene). Among the resins, in particular, the saturated polyester resins are preferred also in consideration of compatibility with the second low-viscosity resin liquid including the thermosetting resin such as an unsaturated polyester resin, melting point, etc.

In this case, the proportion of the thermoplastic resin in upper-layer coating material 5 is preferably 6 weight % to 15 weight %. The reason thereof is that when the proportion of the thermoplastic resin in upper-layer coating material 5 is less than 6 weight %, there is a failure to achieve an adequate low-shrinkage effect on upper-layer coating material 5 or a suppression effect on the generation of cracks. On the other hand, when the proportion of the thermoplastic resin in upper-layer coating material 5 is greater than 15 weight %, defects such as peeling of the upper-layer coating material may be caused during the rotation of the armature, due to decrease the strength (mechanical strength such as, for example, bending strength or tensile strength) or fixing strength (for example, adhesive force to the electric wires, etc.) of upper-layer coating material 5.

In addition, the specific gravity of upper-layer coating material 5 is preferably ranging between 0 (zero) and 1.5 in the present exemplary embodiment. When the specific gravity of upper-layer coating material 5 is greater than 1.5, the upper-layer coating material is likely to be cracked or peeled by a centrifugal force during the high-speed rotation of the armature.

It is to be noted that the present exemplary embodiment has been described with reference to an example of adding the hollow glass beads to upper-layer coating material 5, but is not limited to this example. Without influence on any decrease in the characteristics or reliability of the rotary motor, inorganic fillers other than the hollow glass beads, for example, metal oxides such as calcium carbonate, talc, alumina, aluminum hydroxide, magnesium hydroxide, glass powders, and titanium oxide; or fibrous substances such as glass fibers and potassium titanate fibers; lubricants such as oxidized stearic acid amide and oleic acid amide; antioxidants; flame retardants; and weathering agents, etc. may be added along with the hollow glass beads to the upper-layer coating material. This addition can improve required properties, depending on the intended use.

In addition, the first low-viscosity resin liquid of the lower-layer coating material and the second low-viscosity resin liquid of the upper-layer coating material, which constitute the coating material, have been described in the present exemplary embodiment with reference to an example of using, as the liquids, the same thermosetting resin such as an unsaturated polyester resin, but are not limited to this example. For example, different thermosetting resins may be used for the first low-viscosity resin liquid and the second low-viscosity resin liquid. More specifically, high permeability is important to the lower-layer coating material, whereas properties such as coating properties and resistance to cracking and peeling are important to the upper-layer coating material, and thus, when the same thermosetting resin achieves no adequate effect, different thermosetting resins may be used for the first low-viscosity resin liquid and the second low-viscosity resin liquid. However, in consideration of adhesion between upper-layer coating material 5 and the lower-layer coating material, work efficiency, etc., it is more preferable to use the same thermosetting resin.

In addition, the present exemplary embodiment has been described with reference to an example of applying the upper-layer coating material to both the fan-side coil end and commutator-side coil end, but is not limited to this example. In the present exemplary embodiment, the upper-layer coating material can be easily applied to both the fan-side coil end and commutator-side coil end of the armature, and thus, as a configuration, the upper-layer coating material may be applied to, for example, at least one of the fan-side coil end and the commutator-side coil end. Accordingly, depending on the characteristics, productivity, and cost requested, any rotary motor can be produced with high efficiency by reducing windage loss.

Further, examples of the numerical ranges described above will be described in detail with reference to examples below. Therefore, although the numerical ranges described in the first exemplary embodiment are different from the numerical ranges in the examples, effects similar to the following examples are obviously achieved in the numerical ranges specified in the exemplary embodiment described above.

The coating material for application to the armature of the rotary motor according to the present invention will be described below with reference to specific examples. It is to be noted that the present invention is not to be limited to the following examples, and changes can be made to the materials, etc. used in the practice of the present invention unless the spirit of the invention is changed.

EXAMPLE 1

As example 1, the following coating material was applied to prepare armatures, and the coating material was evaluated from the state of the application and the characteristics of the rotary motor.

First, WP 2851 from Hitachi Chemical Company, Ltd., which was an unsaturated polyester with a viscosity of 0.5 Pa·s at 25° C., was used as the first low-viscosity resin liquid and the second low-viscosity resin liquid. In addition, CT48 from Hitachi Chemical Company, Ltd. was used as a curing agent.

In addition, SUNDHOMA® PB 987 from DH Material Inc., with a saturated polyester dissolved in styrene, was used as the thermoplastic resin, and common hollow glass beads A in the particle size between 2 μm and 25 μm with an average particle size of 12 μm were used as the hollow glass beads. In this case, the content of the saturated polyester was 65% in SUNDHOMA® PB987.

Next, as the lower-layer coating material, 100 parts by weight of WP 2851 and 2 parts by weight of CT48 were mixed to prepare the first low-viscosity resin liquid.

Next, as the upper-layer coating material, 75 parts by weight of WP 2851, 2 parts by weight of CT48, and 25 parts by weight of SUNDHOMA® PB987 were agitated/mixed by a blade-type agitation mixer to prepare a resin liquid. Then, while the hollow glass beads A were varied from 0 parts by weight, 20 parts by weight, through 30 parts by weight, 40 parts by weight, 50 parts by weight, 70 parts by weight, and 80 parts by weight to 90 parts by weight, the hollow glass beads A were added to the prepared resin liquid, and mixed with the use of a sun-and-planet mixer in rotation and revolution. Thus, prepared were eight types of upper-layer coating materials represented by samples from No. 1 to No. 8 in (Table 1) below.

Next, as the armature, electric wires of 0.5 mm in diameter were wound around a laminated iron core of 20 mm in thickness and 40 mm in outer diameter with twenty-two slots to prepare an armature with a commutator of 20 mm in diameter and 18 mm in height on one side. In this case, the coil-end part of the fan-side coil end was approximately 7 mm in height, whereas the coil-end part of the commutator-side coil end was approximately 10 mm in height.

The lower-layer coating material, upper-layer coating material, and the armature were prepared as described above.

The lower-layer coating material and the upper-layer coating material were applied to the armature by the following method.

First, the armature was preheated to 110° C. to incline the shaft of the armature at 5° from the horizontal position, and with the commutator side upward, the armature is attached to a rotation jig.

Next, while the armature attached to the rotation jig was rotated at a rotation speed of 25 rotations/min (rpm), a tubing pump was used to apply the lower-layer coating material by dropping between the electric wires in the slots and in the gaps between the slots and the electric wires.

Then, after the lower-layer coating material was applied, with the armature kept rotating, the armature was put in a thermostatic bath at 140° C. for curing for 20 minutes to firmly fix the electric wires in the slots to each other, and the electric wires to the slots.

Next, the armature with the lower-layer coating material applied thereto was again preheated to 110° C. to apply the upper-layer coating material to the fan-side coil end and the commutator-side coil end at the same time under the same condition as in the application of the lower-layer coating material, and thereafter the upper-layer coating material was subjected to curing for 20 minutes in a thermostatic bath at 140° C. with the upper-layer coating material kept rotating. Thus, armatures of the samples from No. 1 to No. 8 were prepared which were formed with the eight types of respective upper-layer coating materials. In this case, as for the applied amounts of the upper-layer coating materials applied respectively to the samples from No. 1 to No. 8, the amounts for almost the same volume were applied regardless of the additive amounts of the hollow glass beads A. It is to be noted that in the case of the sample of No. 8, the upper-layer coating material with 90 parts by weight of the hollow glass beads A was not able to be applied by dropping with the tubing pump, and thus applied by extrusion with the use of a cylinder.

Next, the armatures of the samples from No. 1 to No. 8, which were prepared by applying the coating materials including the lower-layer coating material and the upper-layer coating materials, were evaluated from the applied state of the upper-layer coating material, the efficiency measured with the armature built in a rotary motor, and a reliability test (ON-OFF test) with the rotary motor incorporated in a main body of a vacuum cleaner.

The results are shown in (Table 1) below. It is to be noted that as the condition for the reliability test, a cycle of running for 16 seconds and stopping for 14 seconds was repeated 20,000 times with a throttle of 13 mm in diameter attached to a suction port of a vacuum cleaner. In addition, the increase in efficiency in (Table 1) is shown as the increase-decrease rate (%) with respect to the sample of No. 1, with the use of, as a reference, the efficiency of the sample of No. 1 where the additive amount of the hollow glass beads A was 0 weight % (parts by weight).

TABLE 1

| | | No. | | | | | | | |
|---|---|---|---|---|---|---|---|---|---|
| | | 1 | 2 | 3 | 4 | 5 | 6 | 7 | 8 |
| Hollow Glass Beads A | parts by weight | 0 | 20 | 30 | 40 | 50 | 70 | 80 | 90 |
| | weight % | 0 | 16.4 | 22.7 | 28.2 | 32.9 | 40.7 | 44.0 | 46.9 |

TABLE 1-continued

| | No. | | | | | | | |
|---|---|---|---|---|---|---|---|---|
| | 1 | 2 | 3 | 4 | 5 | 6 | 7 | 8 |
| Condition of Application | Irregularity of Electric Wire at Coil End | Substantially Smooth at Coil End | Substantially Smooth at Coil End | Smooth at Coil End | Smooth at Coil End | Smooth at Coil End | Smooth at Coil End | Irregularity of Coating material at Coil End |
| Increase in Efficiency (%) | Reference | 0.10 | 0.21 | 0.42 | 0.43 | 0.37 | 0.40 | 0.35 |
| After ON-OFF Test | No Change | No Change | No Change | No Change | No Change | No Change | No Change | Many Cracks with Micro Pieces Peeled |

As shown in (Table 1), the samples from No. 4 to No. 7 obtained by applying the upper-layer coating materials with 40 parts by weight (approximately 28 weight % or more) or more of the hollow glass beads A added thereto have succeeded in smooth application, with almost no irregularity caused by the electric wires of the fan-side coil end and armature-side coil end. In addition, it has been also determined that the efficiency can be also improved by on the order of 0.4%.

However, in the case of the sample of No. 8 with 90 parts by weight (approximately 47 weight %) of the hollow glass beads A added thereto, the upper-layer coating material produced irregularity, thereby failing to form any adequately smooth surface. The reason thereof is that the addition of 90 parts by weight of the hollow glass beads A increases the viscosity of the upper-layer coating material, thus decreasing the fluidity and resulting in almost no flow. Therefore, it is believed that the irregularity in the application of the upper-layer coating material was left on the surface, thereby failing to smooth the application surface.

In addition, the efficiency of the sample of No. 8 is also slightly lower as compared with the samples from No. 4 to No. 7. Moreover, in the ON-OFF test, peeling of micro pieces from the upper-layer coating material was observed with many cracks generated in the upper-layer coating material.

More specifically, it is believed that the addition of 90 parts by weight (approximately 47 weight %) of the hollow glass beads A can improve the efficiency of the rotary motor to some extent, while sounds and vibrations are generated and the reliability of the rotary motor is decreased.

In addition, as shown in (Table 1), among the samples from No. 1 to No. 3 obtained by applying the upper-layer coating materials respectively with 0, 20, and 30 parts by weight of the hollow glass beads A added thereto, the samples of No. 2 and No. 3 have succeeded in substantially smooth application to the irregularity caused by the electric wires of the fan-side coil end and armature-side coil end, but failed to achieve significant improvements in efficiency. The reason is believed to be due to most of the upper-layer coating material dripping during the application, because of the low viscosities of the upper-layer coating material. Furthermore, in the case of the sample of No. 1 with 0 part by weight, the excessively low viscosity of the upper-layer coating material caused a failure to thickly apply the upper-layer coating material to the fan-side coil and the armature-side coil end, thereby showing irregularity caused by the electric wires.

On the other hand, in order to make a comparison with the armature obtained by applying the two-layered coating material of the lower-layer coating material and upper-layer coating material according to the example 1, a comparative sample was prepared by applying twice the first low-viscosity resin liquid as the lower-layer coating material, and evaluated in the same manner as described above. As a result, as in the case of the sample of No. 1, the application was not able to be achieved thickly enough to cover irregularity caused by electric wires of the fan-side coil end and armature-side coil end, and the efficiency was also comparable to No. 1. In addition, as a result of observing the surface of the coating material under a microscope, the generation of many microcracks was confirmed. Moreover, after the ON-OFF test, micro pieces were peeled from the coating material due to the increased cracks in the coating material.

More specifically, it has been determined that when the two-layer coating material includes the same first low-viscosity resin liquid without any thermoplastic resin added to the upper-layer coating material like the comparative sample, cracks are generated by shrinkage of the coating material, and peeling of the coating material is caused in the reliability test. Thus, it has been determined that the addition of the thermoplastic resin to the upper-layer coating material can effectively reduce the generation of cracks and peeling of the coating material.

From the results mentioned above, it has been determined that the addition of 28 weight % to 44 weight % of the hollow glass beans into the upper-layer coating material can ensure the efficiency improvement and reliability of the rotary motor.

EXAMPLE 2

As the example 2, the filler added to the upper-layer coating material of the following coating material was changed to prepare armatures, and the coating material was evaluated from the state of the application and the characteristics of the rotary motor as in the example 1. In this case, the constituents and preparation methods for the lower-layer coating material and upper-layer coating material other than the filler, and the preparation method for the armatures were put into practice under the same conditions as in the example 1.

First, as a filler for a sample of No. 2, hollow glass beads B in the particle size range from 10 μm to 50 μm inclusive with an average particle size of 35 μm were used to prepare an armature. As a filler for a sample of No. 3, a glass powder obtained by grinding glass fibers of 10 μm in diameter to lengths on the order of several 1 μm to 100 μm was used to prepare an armature. As a filler for a sample of No. 4, calcium carbonate in the particle size range from 1 μm to 60 μm inclusive with an average particle size of 10 μm was used to prepare an armature.

Further, in order to make comparisons with the armatures with the fillers according to the samples from No. 2 to No. 4, the results on the armature of the sample of No. 5 prepared by the use of the hollow glass beads A in the example 1 are also listed together in (Table 2) as a sample of No. 1 according to the example 2.

It is to be noted that the fillers for the samples from No. 1 to No. 4 were prepared for the same additive amount of 50 parts by weight (32.9 weight %) as for the sample of No. 1 according to the example 1.

The results are shown in (Table 2) below. In addition, the increase in efficiency in (Table 2) is shown as the increase-decrease rate (%) with respect to the sample of No. 1 according to the example 1, with the use of, as a reference, the efficiency of the sample of No. 1 where the additive amount of the hollow glass beads A was 0 weight % (parts by weight).

TABLE 2

| | No. | | | |
|---|---|---|---|---|
| | 1 | 2 | 3 | 4 |
| Filler | Hollow Glass Beads A | Hollow Glass Beads B | Glass Powder | Calcium Carbonate |
| Condition of Application | Smooth at Coil End | Insufficient Application Thickness and Partial Irregularity of Electric Wire | Substantially Smooth at Coil End | Substantially Smooth at Coil End |
| Increase in Efficiency (%) | 0.43 | 0.16 | 0.42 | 0.39 |
| After ON-OFF Test | No Change | No Change | Many Cracks with Micro Pieces Peeled | Many Cracks with Micro Pieces Peeled |

As shown in (Table 2), in the case of the sample of No. 2 with the use of the hollow glass beads B of large particle sizes as the filler, most of the upper-layer coating material dripped during the application to fail to achieve an adequately thick upper-layer coating material, and the increase in efficiency was also small. This is believed to be due to the fact that the filler of the hollow glass beads B fails to adequately increase the viscosity and thixotropic nature of the upper-layer coating material of the coating material.

In addition, in the case of the sample of No. 3 with the use of the glass powder as the filler and the sample of No. 4 with the use of calcium carbonate as the filler, there is almost no irregularity caused by electric wires of the fan-side coil end and armature-side coil end, thereby having succeeded in smooth application, and also in improvements in efficiency.

However, in the case of the sample of No. 3 and the sample of No. 4, peeling of micro pieces from the coating material was observed with many cracks generated in the coating material in the reliability test. The reason thereof is believed to be due to the centrifugal force increased by the high-speed rotation of the armature, because the specific gravity of the upper-layer coating material of the coating material is increased to between 1.57 and 1.64 inclusive with the specific gravity of the glass powder or calcium carbonate as the filler on the order of 2.5 to 2.7.

On the other hand, the hollow glass beads A as the filler for the sample of No. 1 has a specific gravity of 1.1, and the hollow glass beads B as the filler for the sample of No. 2 has a specific gravity of 0.34. Therefore, in the samples of No. 1 and No. 2, the upper-layer coating material of the coating material undergoes a small increase in specific gravity. As a result, the coating material is believed to have no cracking or peeling caused even in the reliability test.

From the results mentioned above, it has been determined that hollow glass beads with a small specific gravity in a predetermined particle size range are preferred for the filler added to the upper-layer coating material. Thus, it has been determined that the filler can adjust the viscosity of the upper-layer coating material and provide a thixotropic nature.

EXAMPLE 3

As the example 3, the additive amount of the thermoplastic resin including a saturated polyester added to the upper-layer coating material of the following coating material was changed to prepare armatures, and the coating material was evaluated from the state of the application and the characteristics of the rotary motor as in the example 1. In this case, the constituents and preparation methods for the lower-layer coating material and upper-layer coating material other than the additive amount of the thermoplastic resin, and the preparation method for the armatures were put into practice under the same conditions as in the example 1.

First, prepared were samples from No. 1 to No. 6 where the additive amounts of the thermoplastic resin added to the upper-layer coating material were respectively 0 part by weight, 10 parts by weight, 15 parts by weight, 25 parts by weight, 35 parts by weight, and 40 parts by weight. In this case, depending on the additive amount of the thermoplastic resin, the proportion of WP 2851 as the second low-viscosity resin including an unsaturated polyester according to the example 1 was adjusted to 100 parts by weight, 90 parts by weight, 85 parts by weight, 75 parts by weight, 65 parts by weight, and 60 parts by weight to prepare upper-layer coating materials. It is to be noted that the respective samples were prepared while the additive amount of curing agent CT48 and the additive amount of the hollow glass beads A were kept constant respectively at 2 parts by weight and 50 parts by weight.

The results are shown in (Table 3) below. In addition, the increase in efficiency in (Table 3) is shown as the increase-decrease rate (%) with respect to the sample of No. 1 according to the example 1, with the use of, as a reference, the efficiency of the sample of No. 1 according to the example 1 where the additive amount of the hollow glass beads A was 0 weight % (parts by weight). In addition, the thermoplastic resin in terms of weight % in (Table 3) is shown as the saturated polyester excluding styrene in terms of weight %.

TABLE 3

| | | \multicolumn{6}{c}{No.} | | | | | |
|---|---|---|---|---|---|---|---|
| | | 1 | 2 | 3 | 4 | 5 | 6 |
| Thermoplastic Resin | parts by weight | 0 | 10 | 15 | 25 | 35 | 40 |
| | weight % | 0 | 4.3 | 6.4 | 10.7 | 15.0 | 17.1 |
| Condition of Application | | Smooth at Coil End Microcrack | Smooth at Coil End Microcrack | Smooth at Coil End No Crack | Smooth at Coil End No Crack | Smooth at Coil End No Crack | Smooth at Coil End No Crack |
| Increase in Efficiency (%) | | 0.39 | 0.37 | 0.40 | 0.43 | 0.43 | 0.39 |
| After ON-OFF Test | | Microcrack | Microcrack | No Change | No Change | No Change | Microcrack Micro Pieces Peeled |

As shown in (Table 3), regardless of the additive amount of the thermoplastic resin, the samples from No. 1 to No. 6 all undergo an increase on the order of 0.4% in efficiency. However, the samples of No. 1 and No. 2 with small additive amounts of thermoplastic resin have microcracks generated in the coating material after the application. It is believed that this is because the upper-layer coating material failed to achieve an adequate low-shrinkage effect, due to the small additive amounts of thermoplastic resin of 10 parts by weight or less.

On the other hand, in the case of the sample of No. 6 where the additive amount of the thermoplastic resin is 40 parts by weight, after the reliability test, microcracks were generated in the coating material, and peeling of micro pieces from the coating material was furthermore observed. This is believed to be due to the decreased fixing strength of the coating material, resulting in a failure to withstand the centrifugal force in the reliability test.

From the results mentioned above, it has been determined that it is preferable to add 6 weight % to 15 weight % of the thermoplastic resin into the upper-layer coating material. Thus, it has been determined that this addition can ensure the reliability of the rotary motor.

EXAMPLE 4

As the example 4, the thermoplastic resin of SUND-HOMA® PB 987 from DH Material Inc., which was added in the example 1, was changed to a 50% styrene solution of SBS elastomer 315P from Asahi Kasei Chemicals Corporation to prepare an armature under the same other conditions as for the sample of No. 5 according to the example 1, and the coating material was evaluated from the state of the application and the characteristics of the rotary motor as in the example 1. More specifically, the additive amount of the filler including the hollow glass beads A was adjusted to 50 parts by weight (32.9 weight %) to prepare the armatures.

As a result, as in the case of the sample of No. 5 according to the example 1, the coating material has succeeded in smooth application to irregularity caused by electric wires of the fan-side coil end and armature-side coil end. In addition, with the efficiency also improved by on the order of 0.38%, the coating material has no cracking or peeling generated even after the reliability test. More specifically, it has been determined that the thermoplastic resin including the 50% styrene solution of SBS elastomer 315P from Asahi Kasei Chemicals Corporation is effective as an additive for the upper-layer coating material, besides the thermoplastic resin of SUNDHOMA® PB 987.

EXAMPLE 5

As the example 5, armatures of samples from No. 1 to No. 8 were prepared in such a way that the first low-viscosity resin liquid and second low-viscosity resin liquid of WP 2851 from Hitachi Chemical Company, Ltd. as the unsaturated polyester added in the example 1 were changed to NV270 from NITTO SHINKO CORPORATION, whereas the curing agent of CT48 from Hitachi Chemical Company, Ltd., which was added in the example 1, was changed to a curing agent of No. 5 (t-butylperoxybenzoate) from NITTO SHINKO CORPORATION. In this case, the viscosity of NV270 at 25° C. was 0.25 Pa·s.

Then, for the prepared samples from No. 1 to No. 8, the coating material was evaluated from the state of the application and the characteristics of the rotary motor as in the example 1.

The results are shown in (Table 4) below. In addition, the increase in efficiency in (Table 4) is shown as the increase-decrease rate (%) with respect to the sample of No. 1 according to the example 5, with the use of, as a reference, the efficiency of the sample of No. 1 where the additive amount of the hollow glass beads A was 0 weight % (parts by weight).

TABLE 4

| | | \multicolumn{8}{c}{No.} | | | | | | | |
|---|---|---|---|---|---|---|---|---|---|
| | | 1 | 2 | 3 | 4 | 5 | 6 | 7 | 8 |
| Hollow Glass Beads A | parts by weight | 0 | 20 | 30 | 40 | 50 | 70 | 80 | 90 |
| | weight % | 0 | 16.4 | 22.7 | 28.2 | 32.9 | 40.7 | 44.0 | 46.9 |
| Condition of Application | | Irregularity of Electric | Substantially Smooth at | Substantially Smooth at | Smooth at Coil | Smooth at Coil | Smooth at Coil | Smooth at Coil | Irregularity of Coating |

TABLE 4-continued

|  | 1 | 2 | 3 | 4 | 5 | 6 | 7 | 8 |
|---|---|---|---|---|---|---|---|---|
|  | Wire at Coil End | Coil End | Coil End | End | End | End | End | material at Coil End |
| Increase in Efficiency (%) | Reference | 0.07 | 0.16 | 0.37 | 0.39 | 0.38 | 0.36 | 0.34 |
| After ON-OFF Test | No Change | No Change | No Change | No Change | No Change | No Change | No Change | Many Cracks with Micro Pieces Peeled |

As shown in (Table 4), it has been determined that almost the same effect as in the example 1 is achieved even when the change is made to the resin liquid of the first low-viscosity resin liquid and second low-viscosity resin liquid. More specifically, it has been determined that although the viscosity of the first low-viscosity resin liquid and second low-viscosity resin liquid is different from the viscosity in the example 1, the addition of the hollow glass beads significantly increases, in particular, the viscosity of the upper-layer coating material, and can also provide a thixotropic nature. As a result, similar results to those in the example 1 have been achieved as long as the additive amount of the hollow glass beads in the example 5 falls within a comparable range to the additive amount of the hollow glass beads in the example 1.

(Second Exemplary Embodiment)

A method for manufacturing a rotary motor according to the second exemplary embodiment of the present invention will be described below.

In the method for manufacturing a rotary motor according to the present exemplary embodiment, first, the lower-layer coating material and upper-layer coating material for two layers constituting the coating material are applied by dropping or extrusion during the rotation of a preheated armature about the shaft of the armature. Then, the armature is further heated to cure the two-layered coating material. It is to be noted that the compositions of the lower-layer coating material and upper-layer coating material constituting the coating material, and the configuration of the armature are put into practice in the same manner as in the first exemplary embodiment, and descriptions thereof will be omitted.

The method for manufacturing a rotary motor according to the present exemplary embodiment will be described below in detail.

First, an armature with armature winding of electric wires wound is heated, for example, in a thermostatic bath at 110° C. for preliminary heating (preheating). In this case, the heating is carried out during the rotation of the armature at a rotation speed of, for example, 25 rotations/min (rpm) with the armature attached to a rotation jig. It is to be noted that the rotation speed may be any rotation speed as long as no lower-layer coating material drips.

Next, during the rotation of the armature heated to 110° C., the lower-layer coating material constituting the coating material is applied by dropping in a predetermined amount to, for example, coil-end parts of the fan-side coil end and commutator-side coil end of the armature, with the use of, for example, a tubing pump. Then, after the application of the lower-layer coating material, the armature is further cured, for example, for 20 minutes, for example, in a thermostatic bath at 140° C. Then, the armature is cooled down to, for example, room temperature.

In this step, the lower-layer coating material applied to the coil-end parts of the preheated armature undergoes a rapid decrease in viscosity by the heat, thereby penetrating into slots of the armature, and into the gaps between the electric wires. Thereafter, the penetrated lower-layer coating material starts to turn into a gel, and eventually cure to firmly fix the electric wires in the slots to each other, and the electric wires to the slots with adequate strength. However, the lower-layer coating material includes the low-viscosity resin liquid (first low-viscosity resin liquid), thus high in fluidity, and will not thickly applied to the coil-end parts of the armature. Therefore, the lower-layer coating material is insufficient for covering and smoothing irregularity caused by aggregation of electric wires at the coil-end parts of the armature.

Next, the armature with the lower-layer coating material applied thereto is again heated, for example, in a thermostatic bath at 110° C. for preliminary heating (preheating). In this case, the heating is carried out during the rotation of the armature at a rotation speed of, for example, 25 rotations/min (rpm) with the armature attached to a rotation jig. It is to be noted that the rotation speed is not limited to the rotation speed mentioned above, as long as no upper-layer coating material drips.

Next, during the rotation of the armature attached to the rotation jig at a rotation speed of 25 rotations/min (rpm), the upper-layer coating material including the second low-viscosity resin liquid with at least hollow glass beads and a thermoplastic resin added thereto is applied by dropping or by extrusion onto the lower-layer coating material at the fan-side coil end and commutator-side coil end of the armature, with the use of, for example, a tubing pump or a cylinder.

In this step, the upper-layer coating material applied onto the lower-layer coating material at the coil-end parts of the preheated armature undergoes a decrease in viscosity by the heat, and spreads so as to smoothly cover the surface with irregularity at the coil-end parts. Thereafter, upon the application of heat to the gelation onset temperature of the upper-layer coating material at lowest, the viscosity starts to increase rapidly, and the upper-layer coating material is thickly deposited on the electric wires at the coil-end parts with the lower-layer coating material applied thereto. This deposition forms the upper-layer coating material smoothly covering the irregularity caused by aggregation of the electric wires.

Next, after the application of the upper-layer coating material, the armature is further cured, for example, for 20 minutes, for example, in a thermostatic bath at 140° C. Then, the armature is cooled down to, for example, room temperature. Thus, the upper-layer coating material is heated to the curing temperature, and eventually cured.

The armature for a rotary motor is prepared by the manufacturing method described above, and the prepared armature is incorporated to prepare a rotary motor.

The manufacturing method according to the present exemplary embodiment can suppress, by the rotation of the armature, dripping of the coating materials constituting the applied lower-layer coating material and upper-layer coating material before the start of gelation. This suppression causes the lower-layer coating material to penetrate uniformly, and can smooth the surface of the upper-layer coating material applied onto the irregularity of the coil-end parts.

In addition, the manufacturing method according to the present exemplary embodiment uses the shaft of the armature as the rotary shaft, and can thus apply the coating material in a symmetric conical form centered around the shaft of the armature. This application is less likely to cause an imbalance in axial load, and thus able to reduce bearing loss to increase the efficiency.

It is to be noted that although an example of applying the coating material during the rotation of the armature has been described in the present exemplary embodiment, the invention is not limited to this example, and the armature may be also rotated when the coating material is cured by heating.

In addition, although an example of applying the coating material during the horizontal rotation of the shaft of the armature has been described in the present exemplary embodiment, the invention is not limited to this example. For example, the shaft of the armature inclined, for example, at 50 from the horizontal position, and during the rotation with the commutator side upward, the coating material may be applied. This application can cause the coating material to penetrate efficiently, and suppress flowing of the coating material into uncoated parts, such as between copper segments of the commutator. As a result, highly-reliable armatures and rotary motors can be achieved.

In addition, although an example of curing the upper-layer coating material while the upper-layer coating material is uniformly heated in a thermostatic bath has been described in the case of applying the upper-layer coating material in the present exemplary embodiment, the invention is not limited to this example. For example, hot air at a higher temperature than the temperature of the thermostatic bath may be blown to the coil-end parts to which the upper-layer coating material is to be applied, to heat and cure the upper-layer coating material. This can cause only the surface of the upper-layer coating material delivered by dropping to gelate quickly for thick application, while keeping the permeability between the electric wires by reducing the viscosity inside the upper-layer coating material. As a result, the application time for the upper-layer coating material can be reduced.

In addition, although an example of the two-layered coating material including the lower-layer coating material and the upper-layer coating material has been described in the present exemplary embodiment, the invention is not limited to this example. For example, the coating material may be applied three or more times (three or more layers), depending on the size of the armature and the applied amount of the coating material required for eliminating the irregularity of the coil-end parts. In this case, the next coating material may be applied to the at least gelled state before the previously applied coating material is completely cured, or the subsequent coating material may be applied after the previously applied coating material is completely cured.

In addition, although an example of applying the coating material by dropping has been described in the present exemplary embodiment, the invention is not limited to this example, and the application by dropping or the application by extrusion can be selected depending on the viscosity of the coating material. More specifically, when the application by dropping is difficult due to the high viscosity of the coating material, the application by extrusion is preferred. Furthermore, when the coating material is high in viscosity, the coating material may be heated in advance up to the gelation onset temperature, and applied with the viscosity reduced. This can adopt the application by dropping even in the case of high-viscosity coating materials, thereby improving the workability.

In addition, although an example of applying the coating material with a tubing pump has been described in the present exemplary embodiment, the invention is not limited to this example, and the coating material may be applied with the use of a conventional drop applicator for varnish, etc. Thus, conventional drop applicators for coating materials can be used directly, or with a little change such as a change of the pump. Therefore, device cost can be suppressed, and the device is able to be easily introduced without the need to make any major change or adjustment to the manufacturing conditions or the like. As a result, the high productivity can produce armatures and the like at low cost.

INDUSTRIAL APPLICABILITY

The present invention can reduce windage loss to achieve a rotary motor that has an improved efficiency, and is thus useful in the product area and technical field where a rotary motor is incorporated which requires a reduction in load on the global environment for energy conservation.

REFERENCE MARKS IN THE DRAWINGS 1 armature
2 laminated core
3 fan-side coil end
4 commutator-side coil end
5 upper-layer coating material
6 motor section
7 fan section
8 commutator
9 armature winding
10 shaft
11 bearing
12 fan-side bracket
13 commutator-side bracket
14 brush holder
15 carbon brush
16 field magnet
17 field winding
18 fan
19 intake

The invention claimed is:

1. A rotary motor comprising at least a field magnet including field winding, and an armature including armature winding with an electrically insulating coating material applied thereto,
   wherein the coating material comprises at least two layers of: a lower-layer coating material including a first low-viscosity resin liquid; and an upper-layer coating material including a second low-viscosity resin liquid with at least hollow glass beads and a thermoplastic resin added thereto, and
   the hollow glass beads are present in the upper-layer coating in an amount of 28 weight % to 44 weight %, and the thermoplastic resin is present in the upper-layer coating in an amount of 6 weight % to 15 weight %.

2. The rotary motor according to claim 1, wherein the first low-viscosity resin liquid and the second low-viscosity resin liquid comprise at least one thermosetting resin of an unsaturated polyester resin, an epoxy-modified unsaturated polyester resin, and an epoxy resin.

3. The rotary motor according to claim 1, wherein the first low-viscosity resin liquid and the second low-viscosity resin liquid have a viscosity ranging between zero and 1 Pa·s at 25° C.

4. The rotary motor according to claim 1, wherein the hollow glass beads fall between 1 μm and 30 μm in particle size.

5. The rotary motor according to claim 1, wherein the thermoplastic resin is a saturated polyester resin.

6. The rotary motor according to claim 1, wherein the upper-layer coating material has a specific gravity ranging between zero and 1.5.

* * * * *